(12) United States Patent
Blackbeard

(10) Patent No.: US 11,786,343 B2
(45) Date of Patent: Oct. 17, 2023

(54) DENTAL IMPLANTS WITH STEPPED THREADS AND SYSTEMS AND METHODS FOR MAKING THE SAME

(71) Applicant: Southern Implants (PTY) Ltd, Centurion (CA)

(72) Inventor: Graham Alan Blackbeard, Irene (ZA)

(73) Assignee: Southern Implants (PTY) Ltd, Irene (ZA)

( * ) Notice: Subject to any disclaimer, the term of this patent is extended or adjusted under 35 U.S.C. 154(b) by 203 days.

(21) Appl. No.: 17/370,944

(22) Filed: Jul. 8, 2021

(65) Prior Publication Data
US 2022/0008170 A1    Jan. 13, 2022

Related U.S. Application Data

(60) Provisional application No. 63/050,005, filed on Jul. 9, 2020.

(51) Int. Cl.
*A61C 8/00*    (2006.01)
(52) U.S. Cl.
CPC .......... *A61C 8/0024* (2013.01); *A61C 8/0093* (2013.01)
(58) Field of Classification Search
CPC ... A61C 8/0022; A61C 8/0024; A61C 8/0025; A61C 8/0028; A61B 17/86; A61B 17/8605
See application file for complete search history.

(56) References Cited

U.S. PATENT DOCUMENTS

| | | | |
|---|---|---|---|
| 1,401,862 | A | 12/1921 | Marc |
| 2,093,171 | A | 9/1937 | Olson |
| 2,609,604 | A | 9/1952 | Sprague |
| 3,067,740 | A | 12/1962 | Haboush |
| 3,488,779 | A | 1/1970 | Christensen |
| 3,499,222 | A | 3/1970 | Linkow |
| 3,579,831 | A | 5/1971 | Stevens |
| 3,846,846 | A | 11/1974 | Fischer |
| 3,877,339 | A | 4/1975 | Muechinger |
| 3,937,120 | A | 2/1976 | Munse |
| 3,971,135 | A | 7/1976 | Leu |
| 4,104,446 | A | 8/1978 | Johnson |
| 4,145,764 | A | 3/1979 | Suzuki |
| 4,293,302 | A | 10/1981 | Hassler |
| 4,324,550 | A | 4/1982 | Reuther |
| 4,406,623 | A | 9/1983 | Grafelmann |
| 4,414,966 | A | 11/1983 | Stednitz |
| 4,463,753 | A | 8/1984 | Gustilo |
| 4,468,200 | A | 8/1984 | Munch |
| 4,480,997 | A | 11/1984 | Deutsch |
| 4,484,570 | A | 11/1984 | Sutter |
| 4,490,116 | A | 12/1984 | Deutsch |
| 4,495,664 | A | 1/1985 | Blanquaert |
| 4,511,335 | A | 4/1985 | Tatum, Jr. |
| 4,535,487 | A | 8/1985 | Esper |
| 4,537,185 | A | 8/1985 | Stednitz |

(Continued)

*Primary Examiner* — Ralph A Lewis
(74) *Attorney, Agent, or Firm* — NIXON PEABODY LLP

(57) ABSTRACT

A dental implant includes a body and a thread. The body has a central axis, a coronal end, and an apical end. The thread is coupled to the body. The thread has a coronal facing surface, an apical facing surface, and a crest surface positioned between the coronal facing surface and the apical facing surface. The coronal facing surface of the thread has a plurality of steps formed therein.

15 Claims, 14 Drawing Sheets

(56) References Cited

U.S. PATENT DOCUMENTS

| | | |
|---|---|---|
| 4,547,157 A | 10/1985 | Driskell |
| 4,583,898 A | 4/1986 | Sygnator |
| 4,668,191 A | 5/1987 | Plischka |
| 4,713,004 A | 12/1987 | Linkow |
| 4,722,688 A | 2/1988 | Lonca |
| 4,738,623 A | 4/1988 | Driskell |
| 4,787,792 A | 11/1988 | Jenson |
| 4,826,434 A | 5/1989 | Krueger |
| 4,851,008 A | 7/1989 | Johnson |
| 4,863,383 A | 9/1989 | Grafelmann |
| 4,878,915 A | 11/1989 | Brantigan |
| 4,915,628 A | 4/1990 | Linkow |
| 4,932,868 A | 6/1990 | Linkow |
| 4,978,350 A | 12/1990 | Wagenknecht |
| 4,988,299 A | 1/1991 | Branemark |
| 5,000,639 A | 3/1991 | Hinkley |
| 5,000,686 A | 3/1991 | Lazzara |
| 5,026,285 A | 6/1991 | Durr |
| 5,064,425 A | 11/1991 | Branemark |
| 5,076,788 A | 12/1991 | Niznick |
| 5,269,685 A | 12/1993 | Jorneus |
| 5,312,256 A | 5/1994 | Scortecci |
| 5,324,199 A | 6/1994 | Branemark |
| 5,395,195 A | 3/1995 | Fulmer |
| 5,427,527 A | 6/1995 | Niznick |
| 5,435,723 A | 7/1995 | O'Brien |
| 5,533,898 A | 7/1996 | Mena |
| 5,549,677 A | 8/1996 | Durr |
| 5,702,443 A | 12/1997 | Branemark |
| 5,727,943 A | 3/1998 | Beaty |
| 5,954,504 A | 9/1999 | Misch |
| 5,984,681 A | 11/1999 | Huang |
| 6,039,568 A | 3/2000 | Hinds |
| 6,048,204 A | 4/2000 | Klardie |
| 6,102,703 A | 8/2000 | Day |
| 6,196,842 B1 | 3/2001 | Jorneus |
| 6,234,797 B1 | 5/2001 | Ura |
| 6,379,153 B1 | 4/2002 | Schroerning |
| 6,419,492 B1 | 7/2002 | Schroerning |
| 6,431,869 B1 | 8/2002 | Reams, III |
| 6,547,564 B1 | 4/2003 | Hansson |
| 6,887,077 B2 | 5/2005 | Porter |
| 6,896,517 B1 | 5/2005 | Bjorn |
| 6,981,873 B2 | 1/2006 | Choi |
| 7,114,891 B2 | 10/2006 | Hakansson |
| 7,140,825 B2 | 11/2006 | Takahashi |
| 7,632,095 B2 | 12/2009 | Ostman |
| 7,753,942 B2 | 7/2010 | Branemark |
| 8,029,285 B2 | 10/2011 | Holmen |
| 8,043,089 B2 | 10/2011 | Bulard |
| 8,277,218 B2 | 10/2012 | D'Alise |
| 8,377,106 B2 | 2/2013 | Branemark |
| 8,602,782 B2 | 12/2013 | Lomicka |
| 8,647,118 B2 | 2/2014 | Berckmans, III |
| 8,651,863 B2 | 2/2014 | Schroerning |
| 8,920,480 B2 | 12/2014 | Willert |
| 9,131,995 B2 | 9/2015 | Mayfield |
| 9,168,110 B2 | 10/2015 | Towse |
| 9,375,295 B2 | 6/2016 | Carlsson |
| 9,433,453 B2 | 9/2016 | Melkent |
| 9,681,930 B2 | 6/2017 | Thome |
| 9,707,058 B2 | 7/2017 | Bassett |
| 10,070,945 B2 | 9/2018 | Collins |
| 10,085,782 B2 | 10/2018 | Reed |
| D837,378 S | 1/2019 | Thome |
| RE47,397 E | 5/2019 | Waldman |
| 10,337,551 B2 | 7/2019 | Foerster, Jr. |
| 10,414,022 B2 | 9/2019 | Mayfield |
| 10,426,577 B2 | 10/2019 | Mandanici |
| 10,820,969 B2 | 11/2020 | Carvalho |
| 10,898,301 B2 | 1/2021 | Thome |
| 10,905,482 B2 | 2/2021 | Biedermann |
| 10,980,449 B2 | 4/2021 | Lee |
| 2002/0169453 A1 | 11/2002 | Berger |
| 2003/0036036 A1 | 2/2003 | Porter |
| 2003/0143058 A1 | 7/2003 | Takahashi |
| 2004/0006346 A1 | 1/2004 | Holmen |
| 2004/0179914 A1 | 9/2004 | Hakansson |
| 2004/0219488 A1 | 11/2004 | Choi |
| 2006/0084035 A1 | 4/2006 | Volz |
| 2006/0173460 A1 | 8/2006 | Branemark |
| 2006/0269903 A1 | 11/2006 | Bulard |
| 2007/0043372 A1 | 2/2007 | Willmann |
| 2007/0072149 A1 | 3/2007 | Rompen |
| 2007/0269766 A1 | 11/2007 | Hall |
| 2007/0298379 A1 | 12/2007 | D'Alise |
| 2008/0031704 A1 | 2/2008 | Bobo |
| 2008/0125868 A1 | 5/2008 | Branemark |
| 2008/0145819 A1 | 6/2008 | Boettcher |
| 2009/0047630 A1 | 2/2009 | Ostman |
| 2009/0061389 A1 | 3/2009 | Lomicka |
| 2009/0155743 A1 | 6/2009 | Saban |
| 2009/0233256 A1 | 9/2009 | Schroering |
| 2009/0290955 A1 | 11/2009 | Lin |
| 2009/0305189 A1* | 12/2009 | Scortecci ............ A61C 8/0089 433/165 |
| 2010/0114314 A1 | 5/2010 | Lomicka |
| 2010/0211118 A1 | 8/2010 | Christen |
| 2011/0008754 A1 | 1/2011 | Bassett |
| 2011/0111369 A1 | 5/2011 | Laster |
| 2011/0123951 A1 | 5/2011 | Lomicka |
| 2011/0200969 A1 | 8/2011 | Schroerning |
| 2011/0229856 A1 | 9/2011 | Berckmans, III |
| 2013/0248487 A1 | 9/2013 | Mayfield |
| 2013/0323678 A1 | 12/2013 | Towse |
| 2014/0031756 A1 | 1/2014 | Willert |
| 2014/0234800 A1 | 8/2014 | Laster |
| 2015/0044639 A1 | 2/2015 | Carlsson |
| 2015/0056573 A1 | 9/2015 | Collins |
| 2015/0289912 A1 | 10/2015 | Melkent |
| 2015/0289951 A1 | 10/2015 | Mayfield |
| 2016/0166358 A1 | 6/2016 | Thome |
| 2017/0119444 A1 | 5/2017 | Reed |
| 2017/0122359 A1 | 5/2017 | Foerster, Jr. |
| 2018/0132916 A1 | 5/2018 | Biedermann |
| 2018/0263735 A1 | 9/2018 | Carvalho |
| 2018/0318049 A1 | 11/2018 | Mandanici |
| 2019/0133719 A1 | 5/2019 | Thome |
| 2020/0237269 A1 | 7/2020 | Lee |

* cited by examiner

DENTAL IMPLANTS WITH STEPPED THREADS AND SYSTEMS AND METHODS FOR MAKING THE SAME

CROSS-REFERENCE TO RELATED APPLICATIONS

This application claims the benefit of and priority to U.S. Provisional Application No. 63/050,005, filed Jul. 9, 2020, which is hereby incorporated by reference herein in its entirety.

TECHNICAL FIELD

This disclosure relates to dental implants and more specifically to dental implants with stepped threads and systems and methods for making the same.

BACKGROUND

Dental implants are typically machined and/or made using a cutter. Attempts have been made to apply surface treatments to the dental implants after they are machined to alter the surface area (e.g., causing pitting, etc.). Such attempts have used plasma sprayed titanium, plasma sprayed hydroxyapatite, acid etching, and the like. While these treatments helped with some aspects of the dental implant life cycle, some patients still experience failure due to the surface treatments providing a favorable surface for the attachment of biofilms, which leads to peri-implantitis or the eventual failure of the dental implant in the patient's mouth.

The present disclosure is directed to solving these problems and addressing other needs.

SUMMARY

According to some implementations of the present disclosure, a dental implant includes a body and a thread. The body has a central axis, a coronal end, and an apical end. The thread is coupled to the body. The thread has a coronal facing surface, an apical facing surface, and a crest surface positioned between the coronal facing surface and the apical facing surface. The coronal facing surface of the thread has a plurality of steps formed therein.

According to some implementations of the present disclosure, a dental implant includes a body and a thread. The body has a central axis, a coronal end, and an apical end. The thread is coupled to the body. The thread has a coronal facing surface, an apical facing surface, and a crest surface positioned between the coronal facing surface and the apical facing surface. The coronal facing surface of the thread has a first plurality of steps formed therein. The apical facing surface of the thread has a second plurality of steps formed therein. The coronal facing surface is generally at a first angle relative to the central axis of the body and the apical facing surface is generally at a second angle relative to the central axis of the body.

According to some implementations of the present disclosure, a method of making a dental implant includes forming a cutter using a grinder. The grinder has a grit between about 50 and about 200. The method also includes using a computer guided cutting machine and the formed cutter to cut a blank of material to form the dental implant such that the formed dental implant has a thread that is coupled to a body. The body has a central axis, a coronal end, and an apical end.

According to some implementations of the present disclosure, a dental implant includes a body and a thread. The body has a central axis, a coronal end, and an apical end. The thread is coupled to the body. The thread has a coronal facing surface, an apical facing surface, and a crest surface positioned between the coronal facing surface and the apical facing surface. The coronal facing surface of the thread has a first plurality of steps formed therein and/or the apical facing surface of the thread has a second plurality of steps formed therein.

The foregoing and additional aspects and implementations of the present disclosure will be apparent to those of ordinary skill in the art in view of the detailed description of various embodiments and/or implementations, which is made with reference to the drawings, a brief description of which is provided next.

BRIEF DESCRIPTION OF THE DRAWINGS

The foregoing and other advantages of the present disclosure will become apparent upon reading the following detailed description and upon reference to the drawings.

Figure 1A:
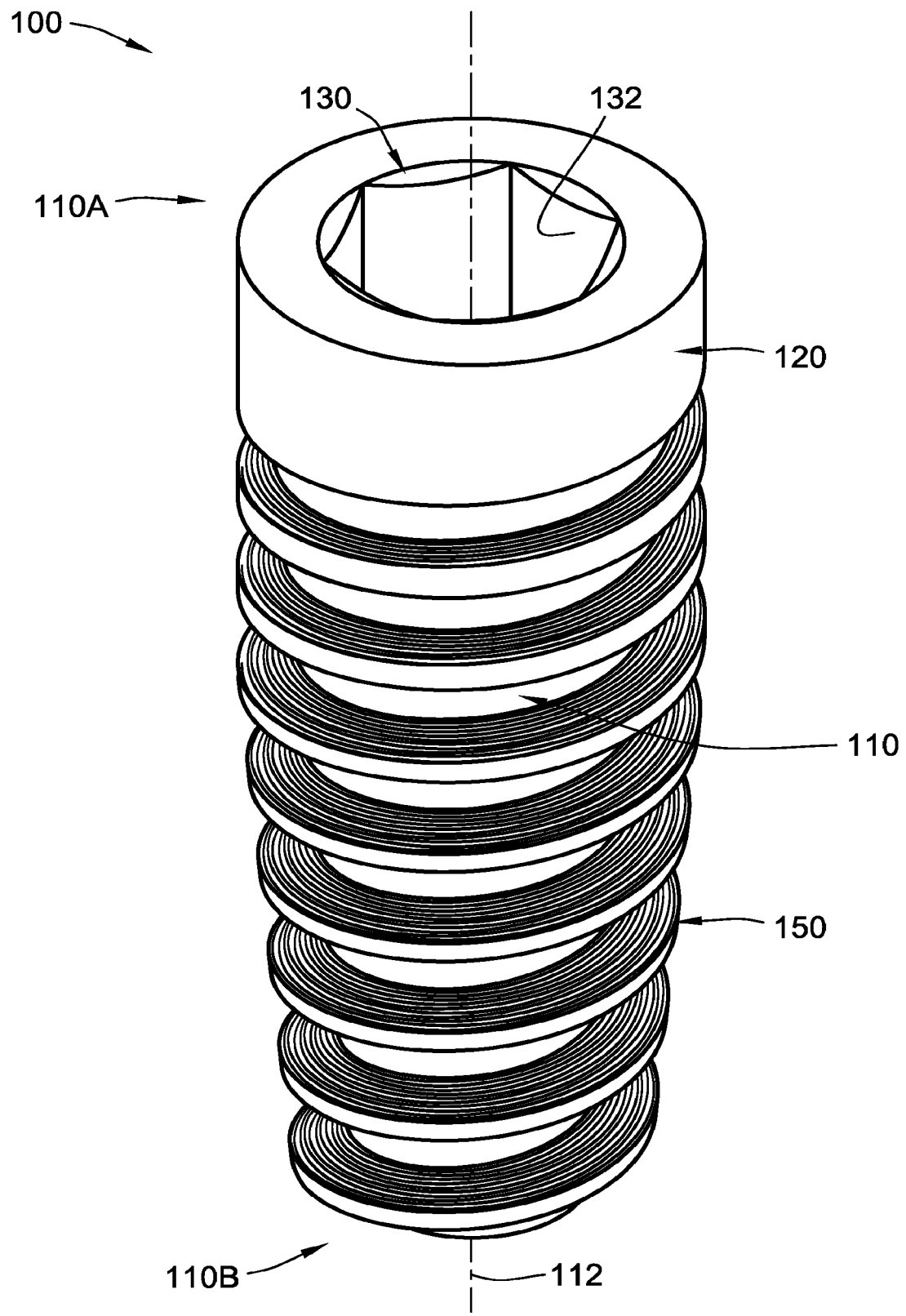
FIG. 1A is a coronal perspective view of a dental implant, according to some implementations of the present disclosure.

While the present disclosure is susceptible to various modifications and alternative forms, specific embodiments have been shown by way of example in the drawings and will be described in detail herein. It should be understood, however, that the present disclosure is not intended to be limited to the particular forms disclosed. Rather, the present disclosure is to cover all modifications, equivalents, and alternatives falling within the spirit and scope of the present disclosure as defined by the appended claims.

DETAILED DESCRIPTION

The present disclosure is directed to a dental implant that does not have a pitted surface created by blast media or acid. Rather, the present disclosure is directed to a dental implant that is machined with a surface having micrometer sized (e.g., about 1 micrometer to about 30 micrometers) features at the time the dental implant is made/machined/formed (not a secondary process). Accordingly, the dental implants of the present disclosure are engineered-turned or machined with a particular surface. The surface of the dental implant of the present disclosure includes steps or grooves or notches or the like or a combination thereof. In some implementations, these steps and/or grooves have one or more dimensions that are matched to the size of typical bone cells (e.g., about 1 micrometer to about 30 micrometers). In some embodiments, the steps and/or grooves have dimensions that are matched to the size of typical fibrinogen (e.g., about 50 angstrom to about 500 angstrom).

Compared with some prior dental implants, achieving a dental implant with micrometer sized features (e.g., pitted surfaces) required a two-step process. First, the dental implant was machined, then a second step of blasting or otherwise treating the surface of the dental implant was required.

Figure 1B:
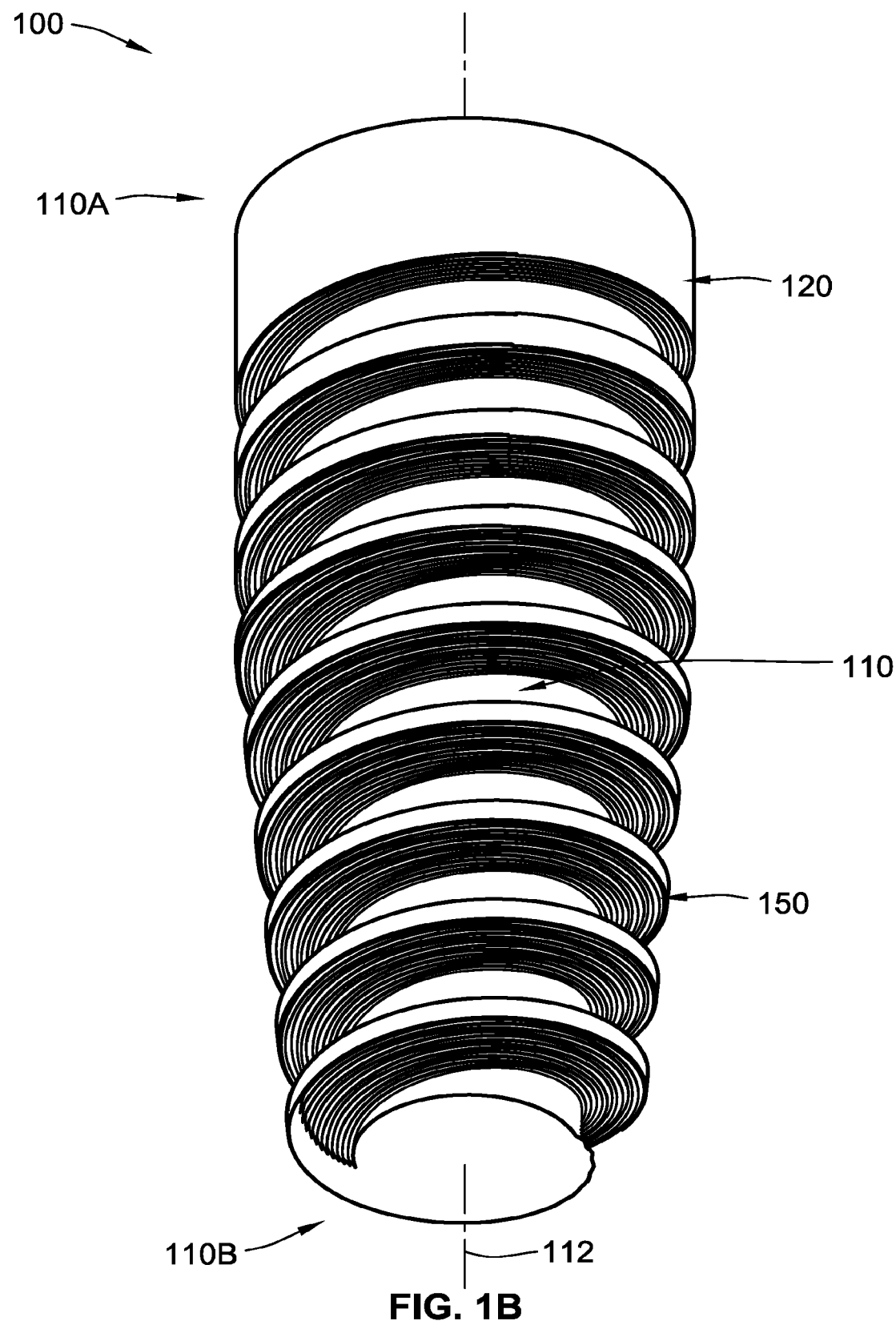
FIG. 1B is an apical perspective view of the dental implant of FIG. 1A.
Figure 2:
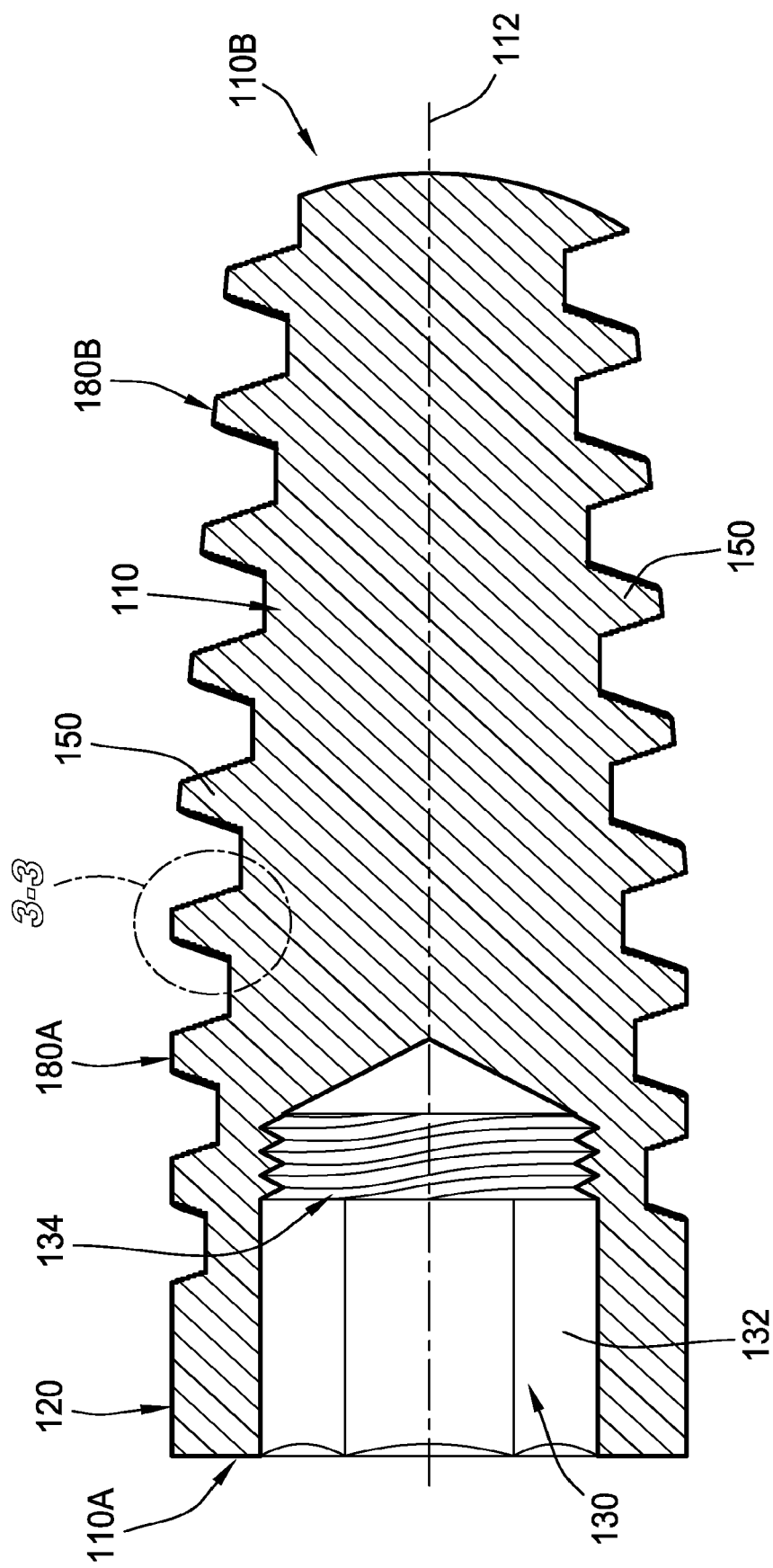
FIG. 2 is a cross-sectional side view of the dental implant of FIG. 1A.

Referring generally to FIGS. 1A, 1B, and 2, a dental implant 100 has a body 110 with a coronal end 110A, an apical end 110B, and a central axis 112. The coronal end 110A can also be referred to as an upper end or top of the dental implant 100 and the apical end 110B can also be referred to as a lower end or bottom of the dental implant 100.

The dental implant 100 optionally includes a collar 120, which defines the coronal end 110A of the body 110. The collar 120 is generally cylindrical and generally smooth (e.g., non-threaded, non-grooved, etc.), whereas the body 110 of the dental implant 100 is generally tapered inwardly in a direction from the coronal end 110A towards the apical end 110B. Alternatively, the collar 120 can be conical (e.g., having a reverse-taper, a taper, or any combination thereof). The collar 120 is free of threads, grooves, notches, ribs, projections, etc., and the like. Alternatively, the collar 120 can be tapered, have any cross-sectional shape (e.g., triangular, polygonal, square, rectangular, oval, or any combination thereof), include a thread(s), etc., or any combination thereof.

The dental implant 100 has an interior bore 130 at or adjacent to the coronal end 110A of the body 110. The interior bore 130 includes and/or defines a non-rotational feature 132 and a threaded feature 134 (FIG. 2). The non-rotational feature 132 can be used for installing the dental implant 100 into bone of a patient using a tool (e.g., a dental implant driver) having a corresponding non-rotational feature. Additionally, the non-rotational feature 132 can be used for mating with a corresponding non-rotational feature of an abutment (not shown) and/or dental prosthesis that is coupled to the dental implant 100. The threaded feature 134 is for engaging, in a threaded manner, with a screw (not shown) to hold the abutment on the dental implant 100.

While the interior bore 130 is shown as having a central axis that is coaxial with the central axis 112 of the body 110, the central axis of the interior bore 130 or a portion thereof can be at a non-zero angle relative to the central axis 112 of the body 110. Such an angled relationship is referred to as a co-axis dental implant. In some implementations, the angle between the central axis 112 of the body 110 and the central axis of the interior bore 130 is, for example, between about 4 degrees and about 60 degrees, about 12 degrees, about 24 degrees, about 36 degrees, about 55 degrees, etc.

The dental implant also includes a thread 150 that is coupled to the body 110. The thread 150 makes a number of turns about the body 110. As best shown in FIG. 2, the thread 150 starts at the collar 120 and extends about the body 110 (e.g., making about eight turns) to the apical end 110B of the body 110. While the dental implant 100 includes only one thread 150, other implementations of a dental implant according to aspects of the present disclosure can include multiple threads (e.g., two threads having two distinct starts). While the thread 150 makes about eight turns about the body 110, the thread 150 can have various pitches such that the number of turns about the body 110 varies (e.g., about one turn about the body 110, about two turns about the body 110, about three turns about the body 110, about four turns about the body 110, about five turns about the body 110, about six turns about the body 110, about seven turns about the body 110, about eight turns about the body 110, about nine turns about the body 110, or any other number of full and/or partial turns about the body 110).

Figure 3:
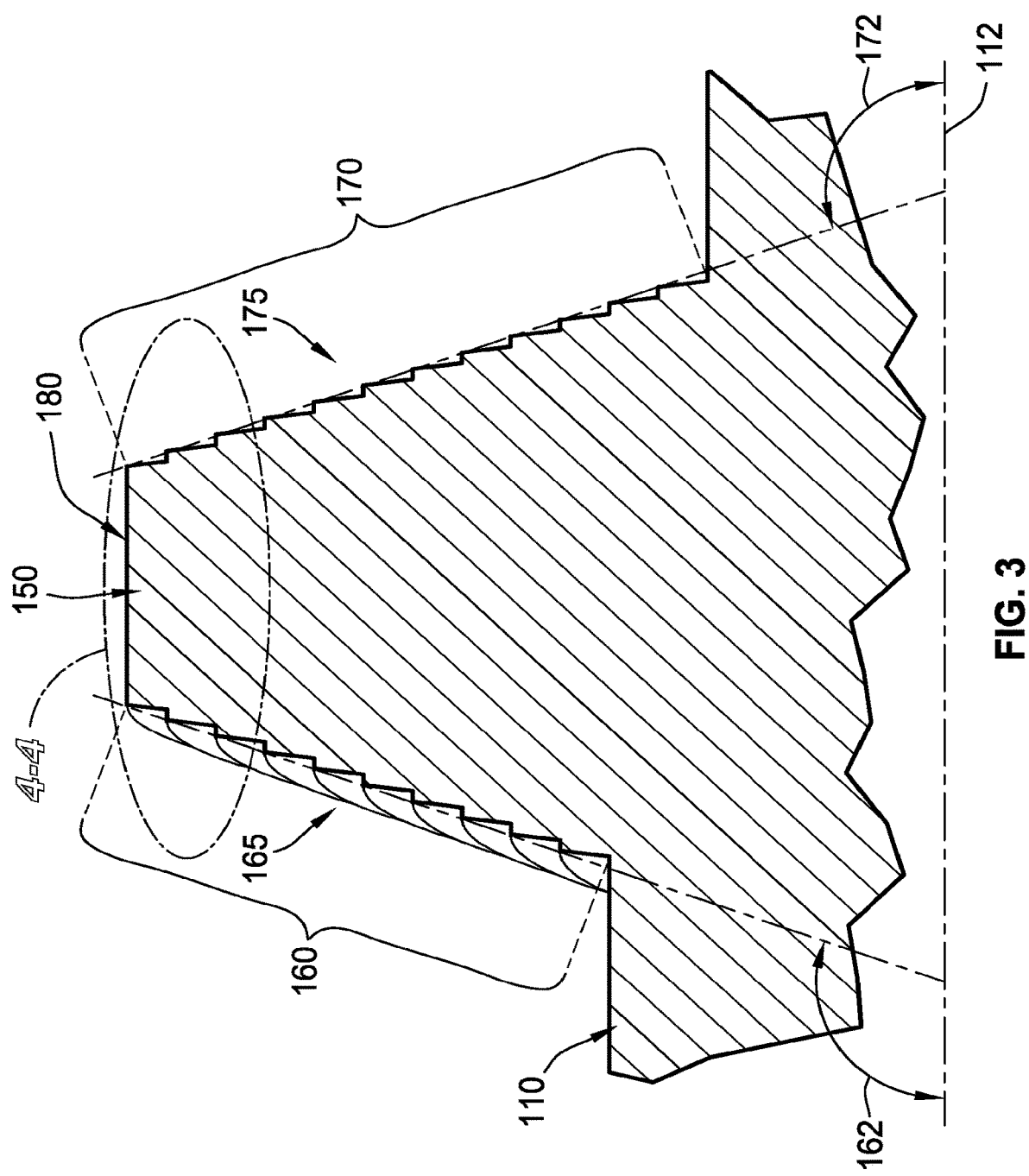
FIG. 3 is an enlarged view of a portion of the cross-sectional side view of FIG. 2 illustrating a cross-section of a thread of the dental implant of FIG. 1A, according to some implementations of the present disclosure.

Referring to FIG. 3, an enlarged cross-sectional view of the thread 150 or one turn or portion of the thread 150 is shown to illustrate aspects of the present disclosure. The thread 150 has or defines a coronal facing surface 160, an apical facing surface 170, and a crest surface 180, where the crest surface 180 is positioned between the coronal facing surface 160 and the apical facing surface 170. The thread 150 also has or defines a root surface positioned on either side of the turn of the thread 150. Put another way, a portion of the root surface is depicted left of the coronal facing surface 160 and another portion of the root surface is depicted right of the apical facing surface 170. The root surface is the portion of the thread that is generally between the crest surfaces and not including the coronal facing surface 150 nor the apical facing surface 170.

The coronal facing surface 160 is at an angle 162 relative to the central axis 112 of the body 110. As shown, the angle 162 is about one hundred and ten degrees. Alternatively, the angle 162 can be between about one hundred degrees and about one hundred and sixty degrees, between about one hundred degrees and about one hundred and twenty degrees, or any other angle. Put another way, the coronal facing surface is at an angle of about twenty degrees with respect to vertical in FIG. 3.

The apical facing surface 170 is at an angle 172 relative to the central axis 112 of the body 110. As shown, the angle 172 is about one hundred and ten degrees (or −110 degrees). Alternatively, the angle 172 can be between about one hundred degrees (or −100 degrees) and about one hundred and sixty degrees (or −160 degrees), between about one hundred degrees (or −100 degrees) and about one hundred and twenty degrees (or −120 degrees), or any other angle. Put another way, the apical facing surface is at an angle of about twenty degrees with respect to vertical in FIG. 3. While the angle 172 is shown as corresponding to and/or being a mirror image or general mirror image of the angle 162, in some alternative implementations, the angle 172 can differ and not correspond to the angle 162. For example, in some implementations, the angle 162 can be 20 degrees from vertical and the angle 172 can be −30 degrees from vertical.

The crest surface 180 is generally parallel to the central axis 112 of the body 110. Alternatively, the crest surface 180 can be at any angle relative to the central axis 112 of the body 110. In some implementations, the crest surface 180 of the thread 150 changes along the length of the thread 150 and/or from one turn of the thread 150 to another turn of the thread 150.

For example, referring to FIG. 2, the angle of a first crest surface 180A or a first portion of the crest surface 180 of the thread 150 is generally parallel to the central axis 112 of the body 110, whereas a second crest surface 180B or a second portion of the crest surface 180 of the thread 150 is at an angle relative to the central axis 112 of the body 110.

In some implementations, the crest surface 180 or a portion thereof can be at any angle or angles relative to the central axis 112 of the body 100. For example, the angle of the crest surface 180 or a portion thereof can be about one degree, about three degrees, about five degrees, about seven degrees, about ten degrees, about fifteen degrees, or any other degree(s).

Referring back to FIG. 3, the coronal facing surface 160 has a plurality of steps 165 formed therein. As shown, the plurality of steps 165 includes about ten steps, although the plurality of steps 165 can include any number of steps (e.g., at least three steps, between about three steps and about thirty steps, about six steps, about fifteen steps, etc.). Similarly, the apical facing surface 170 has a plurality of steps 175 formed therein. As shown, the plurality of steps 175 includes about twelve steps, although the plurality of steps 175 can include any number of steps (e.g., at least three steps, between about three steps and about thirty steps, about six steps, about fifteen steps, etc.).

While both the coronal facing surface 160 and the apical facing surface 170 are shown as having the steps 165, 175, respectively, in some implementations, only the coronal facing surface 160 or only the apical facing surface 170 has steps formed therein. Additionally, while the steps 165, 175 are shown as extending along the entire coronal facing surface 160 and the entire apical facing surface 170, respectively, in some implementations, the steps 165 and/or 175 only extend along a portion or portions of the coronal facing surface 160 and/or the apical facing surface 170.

Figure 4:
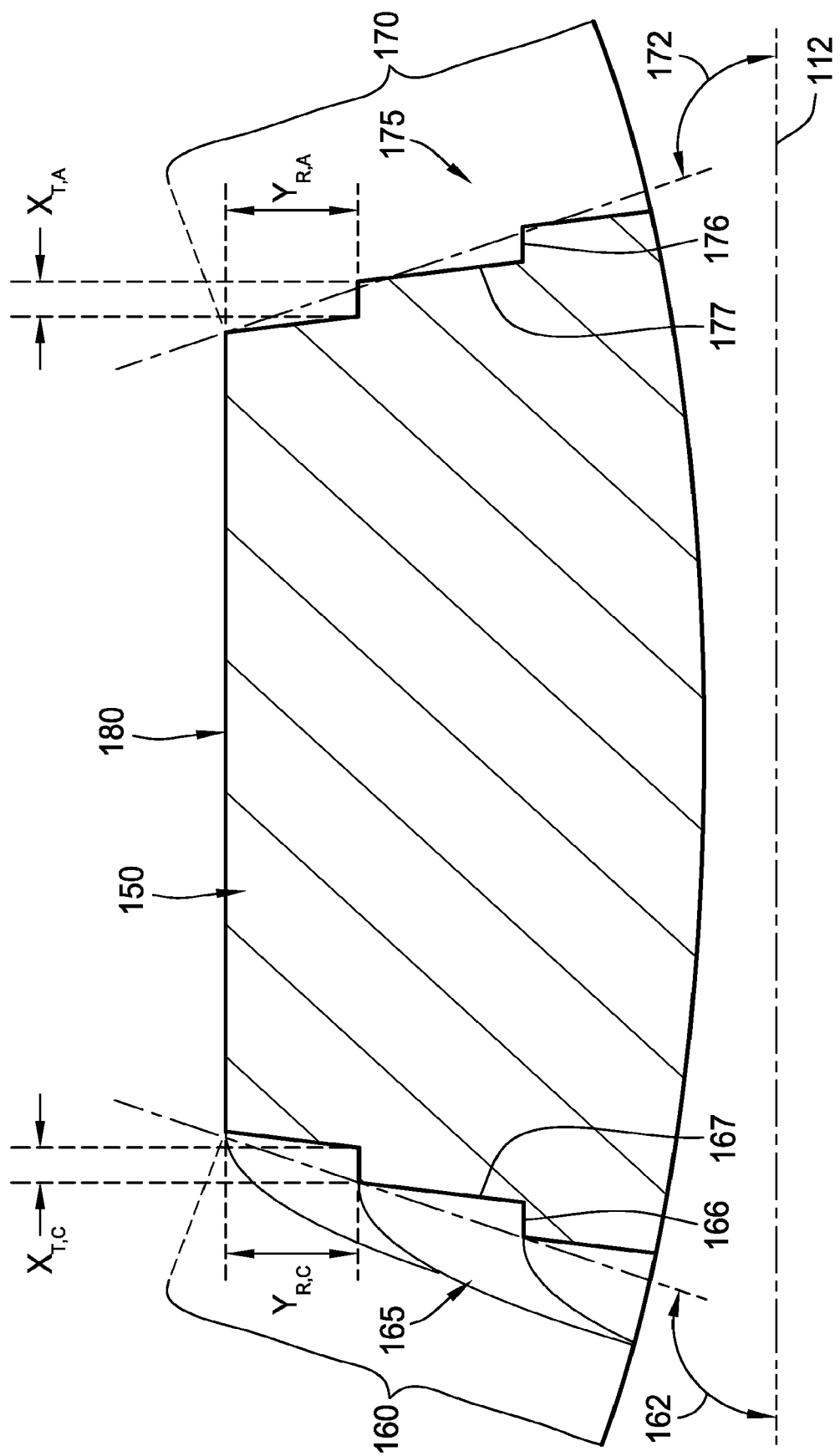
FIG. 4 is an enlarged view of a portion of the cross-sectional side view of FIG. 3 illustrating a cross-section of the thread of the dental implant of FIG. 1A and a number of steps of the thread, according to some implementations of the present disclosure.

Referring to FIG. 4, an enlarged view of a portion of FIG. 3 is shown to better illustrate the geometry of the steps 165, 175. Each of the steps 165 includes a tread 166 and a riser 167. Similarly, each of the steps 175 includes a tread 176 and a riser 177.

The treads 166 of the steps 165 formed in the coronal facing surface 160 extend generally in a first direction that is generally parallel with the central axis 112 of the body 110. The risers 167 of the steps 165 of the coronal facing surface 160 extend generally in a second direction that is at an angle relative to the first direction. As shown, the risers 167 are at an angle of about 97.5 degrees relative to the treads 166. Alternatively, the risers 167 can be at any angle relative to the treads 166 (e.g., between about 90 degrees and about 150 degrees, about 90 degrees, about 100 degrees, about 110 degrees, etc.). In some implementations, the treads 166 are at a non-zero angle relative to the central axis 112 of the body 110 (e.g., between about 1 degree and about fifteen degrees, etc.).

The treads 166 of the coronal facing surface 160 each have a length or width or size, $X_{T,C}$, that is between about one micrometer and about ten micrometers, about two micrometers, about three micrometers, about four micrometers, about five micrometers, etc. The risers 167 of the coronal facing surface 160 each have a length or width or size, $Y_{R,C}$, that is between about one micrometer and about sixty micrometers, about two micrometers, about four micrometers, about five micrometers, about ten micrometers, about fifteen micrometers, about twenty micrometers, about twenty-five micrometers, about thirty micrometers, about forty micrometers, about fifty micrometers, etc.

The length or width or size, $X_{T,C}$, of the tread 166 and/or the length or width or size, $Y_{T,C}$, of the riser 167 of each of the plurality of steps 165 are based at least in part on the angle 162 of the coronal facing surface 160 and/or on the number of steps in the plurality of steps 165. That is, as the number of steps formed in the coronal facing surface 160 is altered, the dimensions of the treads 166 and/or risers 167 is modified for the coronal facing surface 160 to maintain the angle 162.

The treads 166 and the risers 167 have a combined cross-section with a general L-shape. Alternatively, the treads 166 and the risers 167 can have a combined cross-section with any shape (e.g., a general C-shape, a general V-shape, a general U-shape, a general polygonal shape, or any combination thereof).

Similarly to the treads 166 and the risers 167, the treads 176 of the steps 175 formed in the apical facing surface 170 extend generally in the first direction that is generally parallel with the central axis 112 of the body 110. The risers 177 of the steps 175 of the apical facing surface 170 extend generally in a third direction that is at an angle relative to the first direction. As shown, the risers 177 are at an angle of about 97.5 degrees relative to the treads 176. Alternatively, the risers 177 can be at any angle relative to the treads 176 (e.g., between about 90 degrees and about 150 degrees, about 90 degrees, about 100 degrees, about 110 degrees, etc.). In some implementations, the treads 176 are at a non-zero angle relative to the central axis 112 of the body 110 (e.g., between about 1 degree and about fifteen degrees, etc.).

The treads 176 of the apical facing surface 170 each have a length or width or size, $X_{T,A}$, that is between about one micrometer and about ten micrometers, about two micrometers, about three micrometers, about four micrometers, about five micrometers, etc. The risers 177 of the apical facing surface 170 each have a length or width or size, $Y_{R,A}$, that is between about one micrometer and about sixty micrometers, about two micrometers, about four micrometers, about five micrometers, about ten micrometers, about fifteen micrometers, about twenty micrometers, about twenty-five micrometers, about thirty micrometers, about forty micrometers, about fifty micrometers, etc.

The length or width of size, $X_{T,A}$, of the tread 176 and/or the length or width or size, $Y_{T,A}$, of the riser 177 of each of the plurality of steps 175 are based at least in part on the angle 172 of the apical facing surface 170 and/or on the number of steps in the plurality of steps 175. That is, as the number of steps formed in the apical facing surface 170 is altered, the dimensions of the treads 176 and/or risers 177 is modified for the apical facing surface 170 to maintain the angle 172.

The treads 176 and the risers 177 have a combined cross-section with a general L-shape. Alternatively, the treads 176 and the risers 177 can have a combined cross-section with any shape (e.g., a general C-shape, a general V-shape, a general U-shape, a general polygonal shape, or any combination thereof).

While the steps 165 are a mirror image of the steps 175, in some implementations, the steps 165 are not a mirror image of the steps 175. While each of the steps 165 is shown as having the same dimensions and each of the steps 175 is shown as having the same dimensions, in some implementations, the dimensions of one or more of the steps 165, 175 can be different. For example, in some such alternative implementations, a first one of the steps 165 of the coronal facing surface 160 has a first riser 167 with a first length and a second one of the steps 165 of the coronal facing surface 160 has a second riser 167 with a second length that is different from the first length.

Referring generally to FIGS. 5A-5G, a method of making the dental implant 100 is illustrated according to some implementations of the present disclosure. Initially, a cutter 200 is formed or obtained. In some implementations, the cutter 200 is formed using a grinder (not shown) having a grit between about 50 and about 200 (e.g., a grit of about 50, about 60, about 75, about 100, about 125, about 150, about 175, about 200, etc.). By grit, it is meant to infer a roughness of the grinder, where, for example, a grinder having a 100 grit is substantially rougher than a grinder having 600 grit. It is common for dental implants to be formed using grinders having 600 grit, which results in dental implants have relatively smooth finishes (e.g., not pitted). In some implementations, use of a grinder with a larger grit (e.g., a rougher surface), such as between about 50 grit and about 200 grit, to form the cutter 200, allows the cutter 200 to impart a grooved surface on the dental implant 100.

The cutter 200 is coupled to and/or installed in a computer guided cutting machine 250 or the like. An implant blank 300 is also coupled to and/or positioned within the computer guided cutting machine 250 adjacent to the cutter 200. As shown, the implant blank 300 includes the interior bore 130, the non-rotational feature 132, and the threaded feature 134 as pre-formed features of the implant blank 300. Alternatively, the implant blank 300 can be a blank part (e.g., a solid generally cylindrical rod) having any shape that does not initially include the interior bore 130, the non-rotational feature 132, and the threaded feature 134.

With the cutter 200 and implant blank 300 so positioned, the computer guided cutting machine 250 begins to form or cut the dental implant 100 (FIG. 1A). As can be seen by comparing FIG. 5A with FIG. 5B, the computer guided cutting machine 250 begins with one or more cuts to form and/or define the collar 120, the crest surface 180 (completed crest surface is shown in FIG. 2), and the apical end 110B of the dental implant 100. In some implementations, the one or more cuts includes the computer guided cutting machine 250 rotating the implant blank 300 about its central axis 112 and moving (e.g., back and forth) the cutter 200 in the directions of arrow A and/or arrow B.

With the collar, 120, the crest surface 180, and the apical end 110B formed in the implant blank 300 (FIG. 5B), the computer guided cutting machine 250 positions the cutter 200 at a thread cutting starting position 310 (FIG. 5C) adjacent to the collar 120. The depth of this cut is set by the computer guided cutting machine 250 to match or be the length or width or size, $Y_{R,A}$ (and/or $Y_{R,C}$) of the riser 177 (FIG. 4) of a first or outermost one of the plurality of steps 175 (FIG. 4) formed in the apical facing surface 170. With the depth of cut set, the cutter 200 is moved between the collar 120 and the apical end 110B in the directions of arrow A and/or arrow B to form the riser 177 and the tread 176 of the first or outermost one of the plurality of steps 175. Accordingly, a first portion of the thread 150 is also formed along the length of the implant blank 300.

Figure 5A:
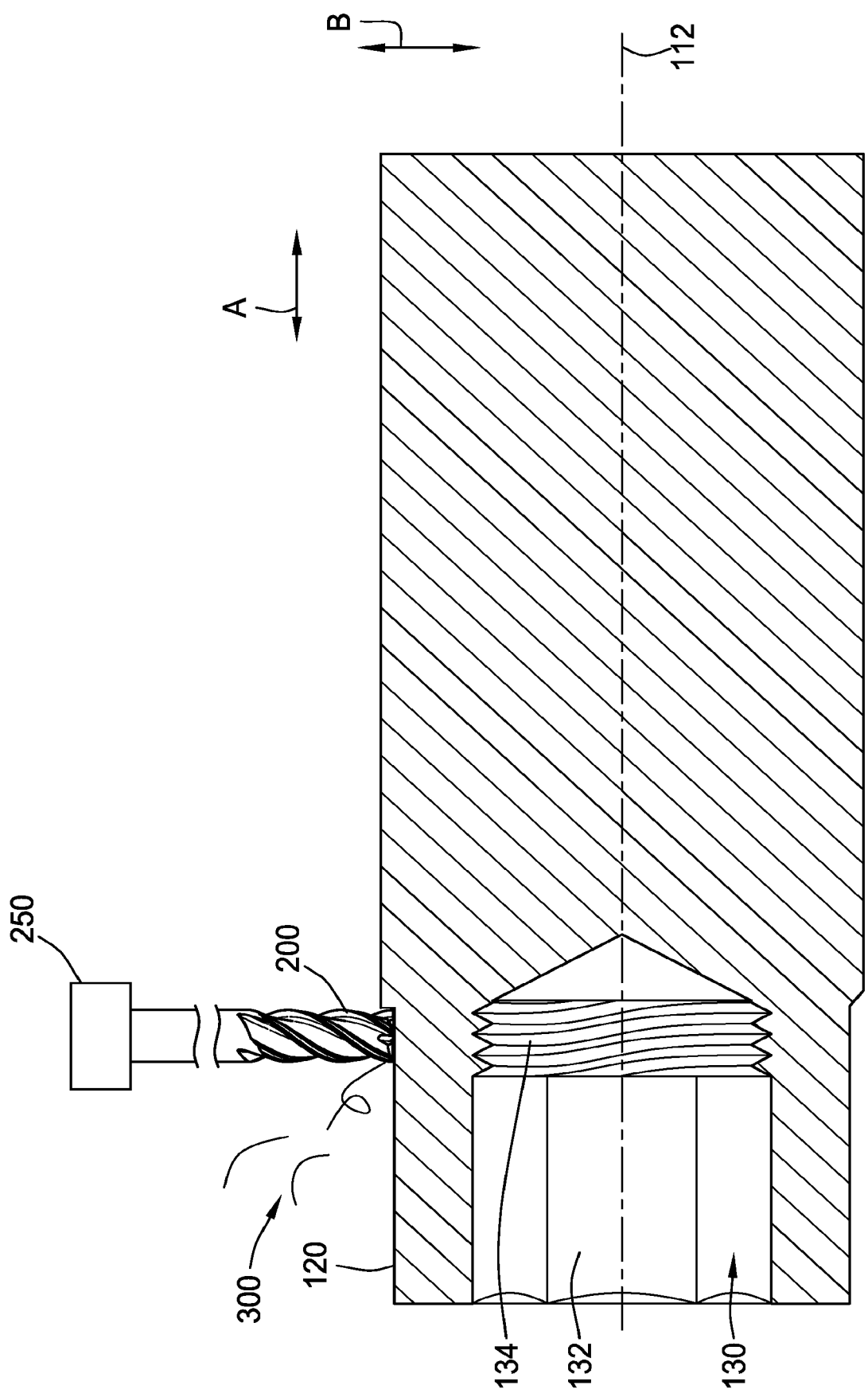
FIG. 5A is a cross-sectional side view illustrating a portion of a method of making a dental implant from a blank using a cutter, according to some implementations of the present disclosure.
Figure 5B:
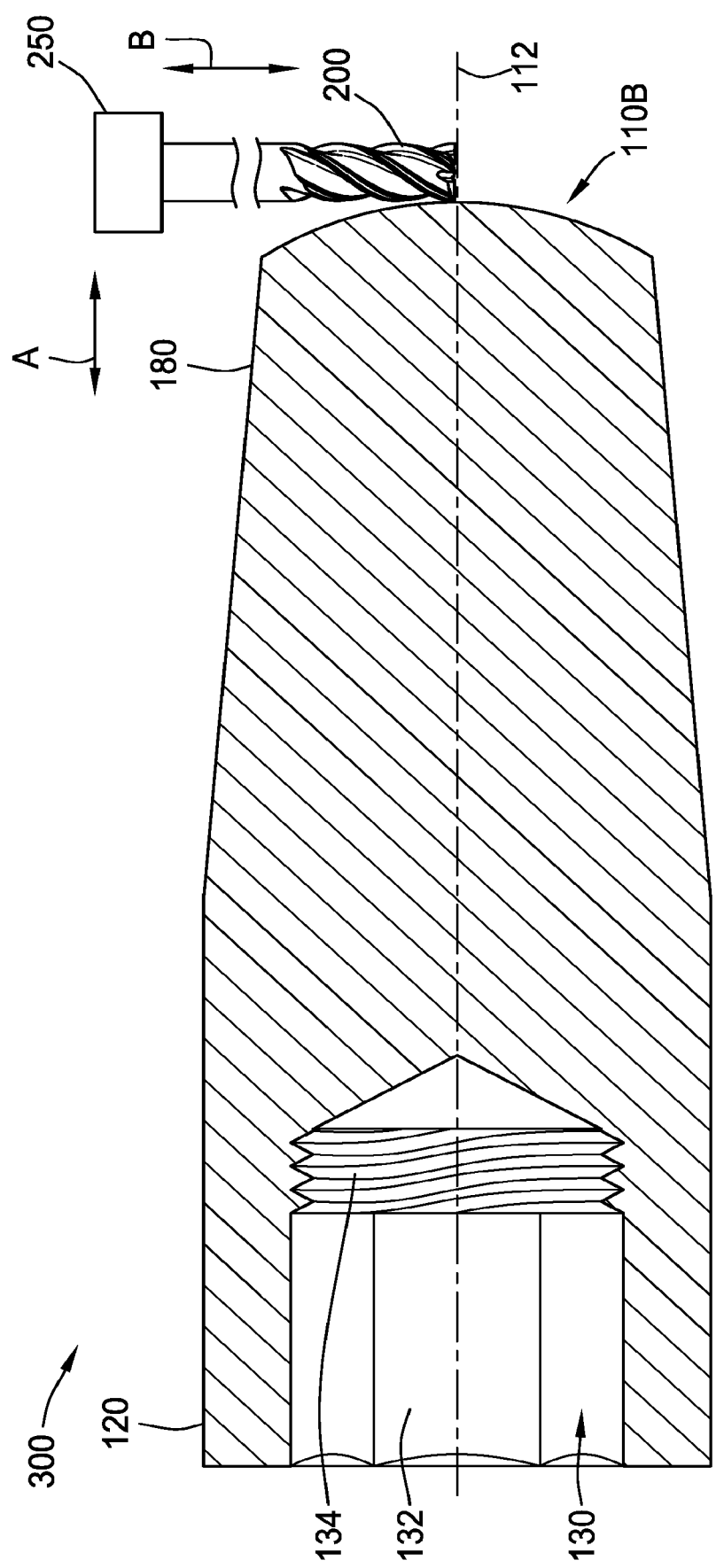
FIG. 5B is a cross-sectional side view illustrating another portion of the method of making the dental implant from the blank of FIG. 5A, according to some implementations of the present disclosure.
Figure 5C:
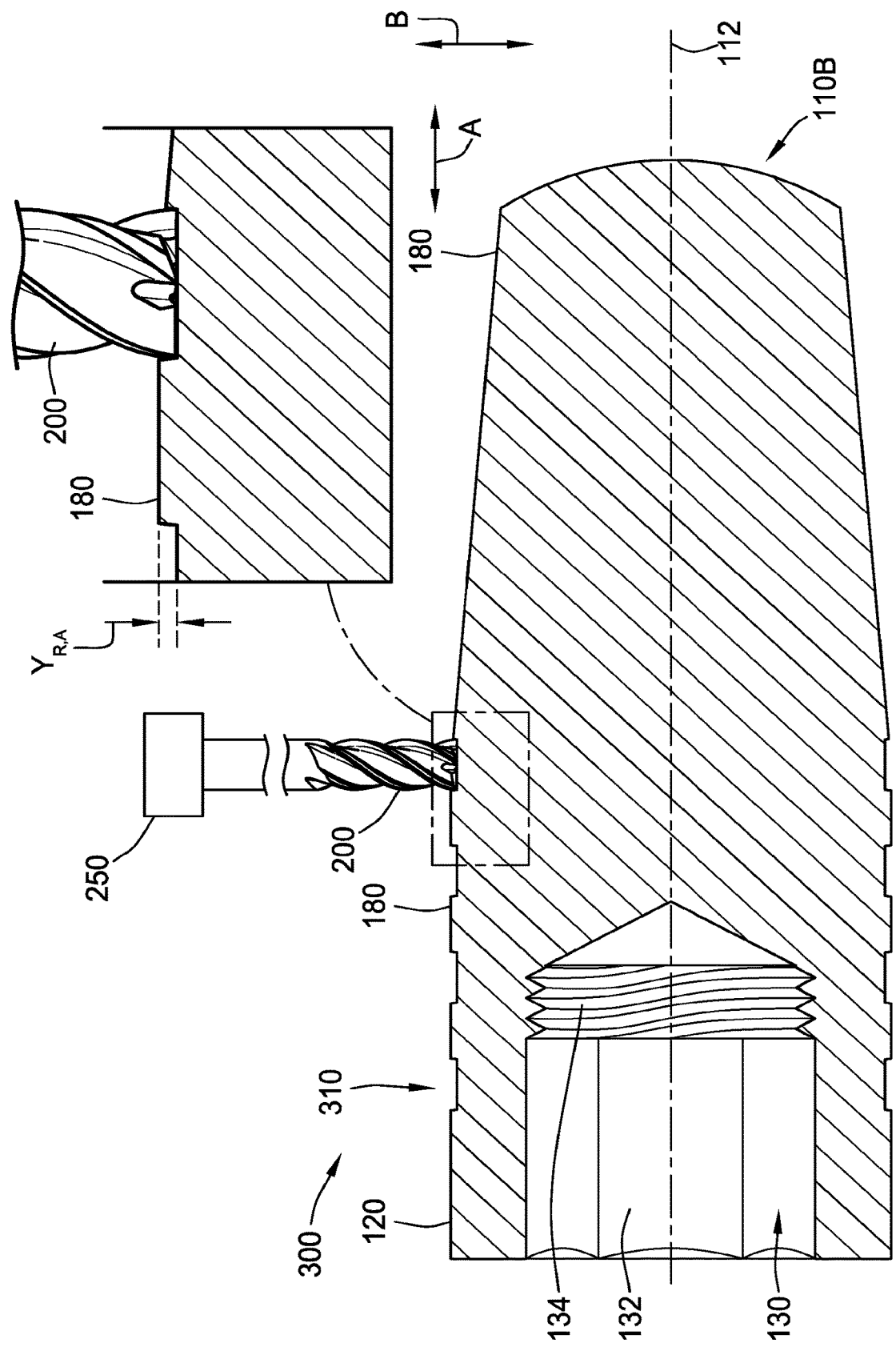
FIG. 5C is a cross-sectional side view illustrating another portion of the method of making the dental implant from the blank of FIG. 5A, according to some implementations of the present disclosure.
Figure 5D:
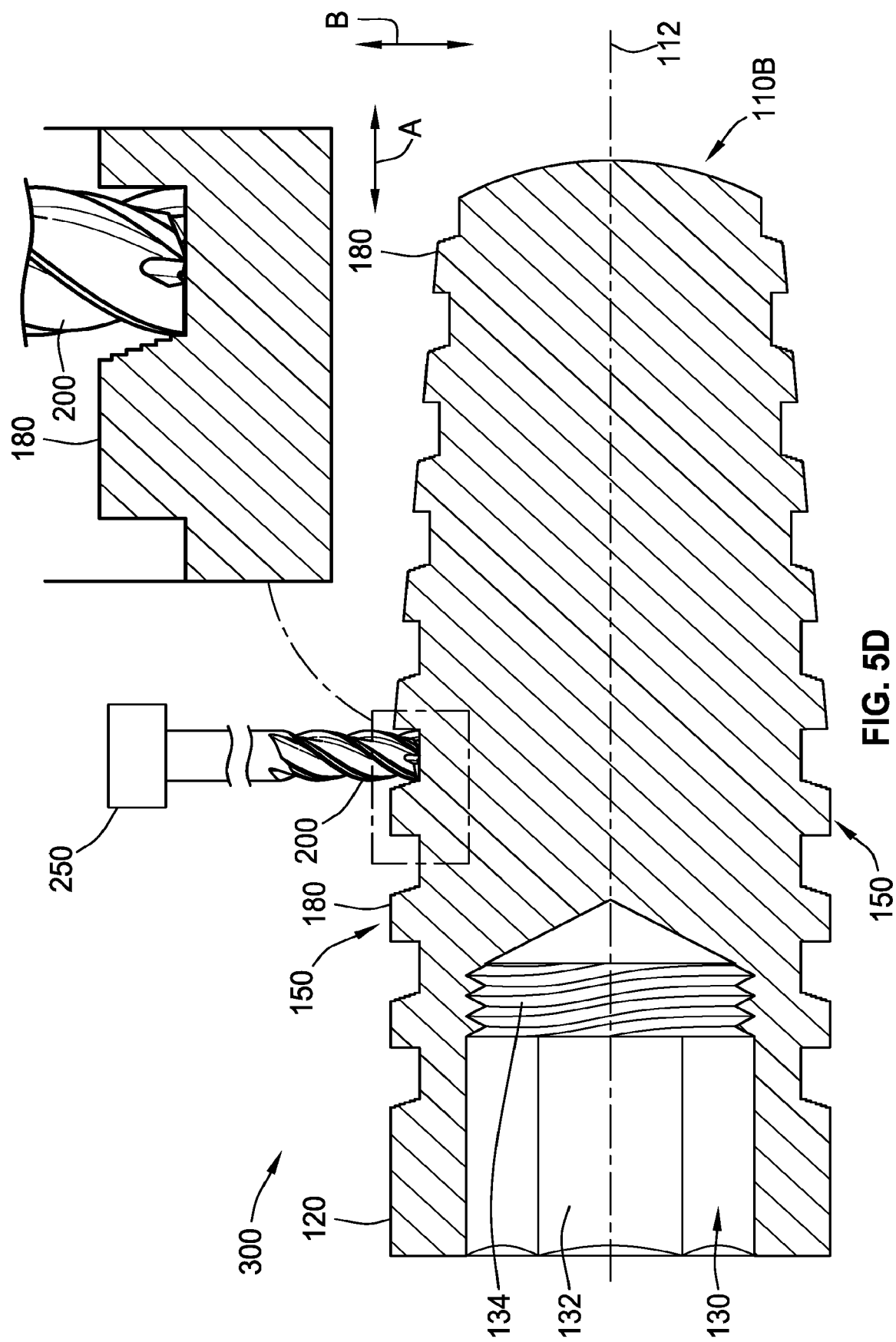
FIG. 5D is a cross-sectional side view illustrating another portion of the method of making the dental implant from the blank of FIG. 5A, according to some implementations of the present disclosure.

The process of forming the plurality of steps 175 in the apical facing surface 170 continues by generally returning the cutter 200 to the thread cutting starting position 310 such that the cutter 200 is shifted laterally (e.g., further to the right of the collar 120 by a distance equal to the length of the tread 176) and the depth of cut is adjusted (e.g., further inward towards the central axis 112 by a distance equal to the length of the riser 177). Then the process of moving the cutter 200 in the directions of arrow A and/or arrow B to form the riser 177 and the tread 176 of the second and subsequent ones of the plurality of steps 175 occurs. Accordingly, additional portions of the thread 150 are also formed along the length of the implant blank 300. That is, the thread 150 is formed as the steps 175 are formed, not as a separate action. As shown in FIG. 5D, the process of cutting the steps 175 in the apical facing surface 170 was completed five times and the sixth step 175 is shown as being partially completed as the cutter 200 still needs to move along the length of the implant blank 300 towards the apical end 110B to complete the sixth step in the remaining turns of the thread 150.

Figure 5E:
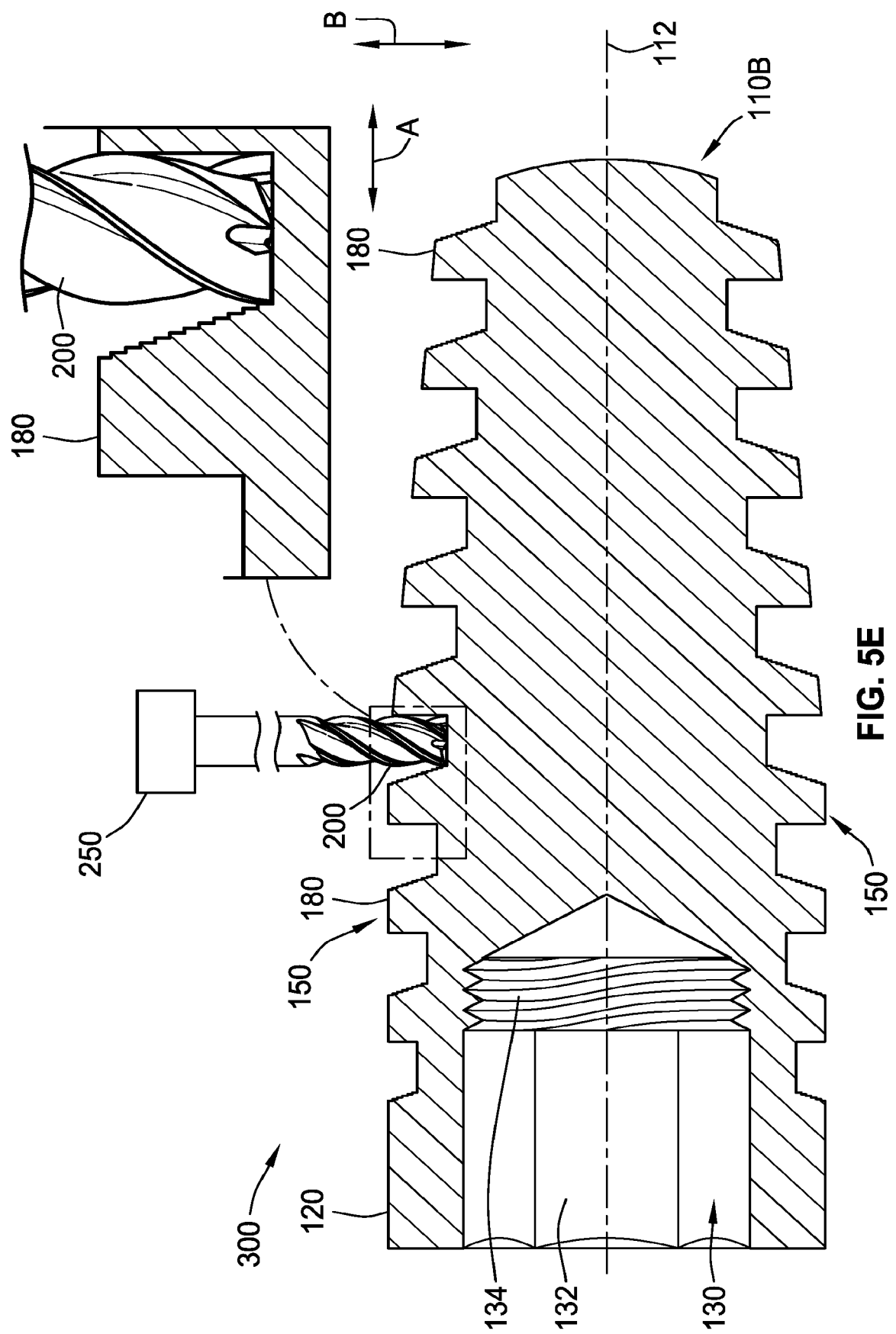
FIG. 5E is a cross-sectional side view illustrating another portion of the method of making the dental implant from the blank of FIG. 5A, according to some implementations of the present disclosure.

Further, referring to FIG. 5E, the process of moving the cutter 200 in the directions of arrow A and/or arrow B to form the riser 177 and the tread 176 of the sixth through eleventh ones of the plurality of steps 175 (for at least some of the turns of the thread 150 as not all turns have the same number of steps 175) has occurred with the twelfth one of the plurality of steps 175 being partially formed. After all of the steps 175 are formed in the apical facing surface 170, the steps 165 can be formed in the coronal facing surface 160 in the same, or similar, manner.

Figure 5F:
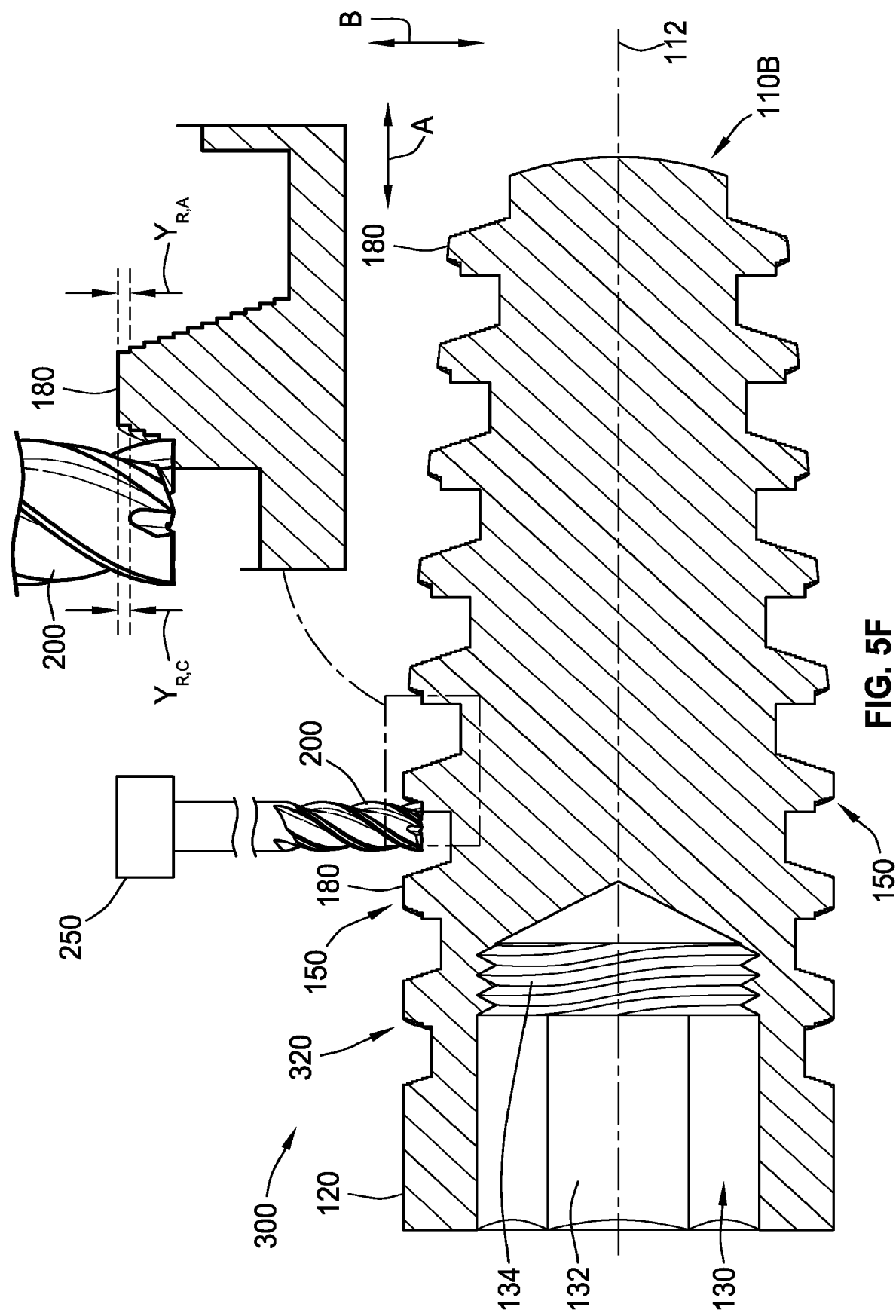
FIG. 5F is a cross-sectional side view illustrating another portion of the method of making the dental implant from the blank of FIG. 5A, according to some implementations of the present disclosure.
Figure 5G:
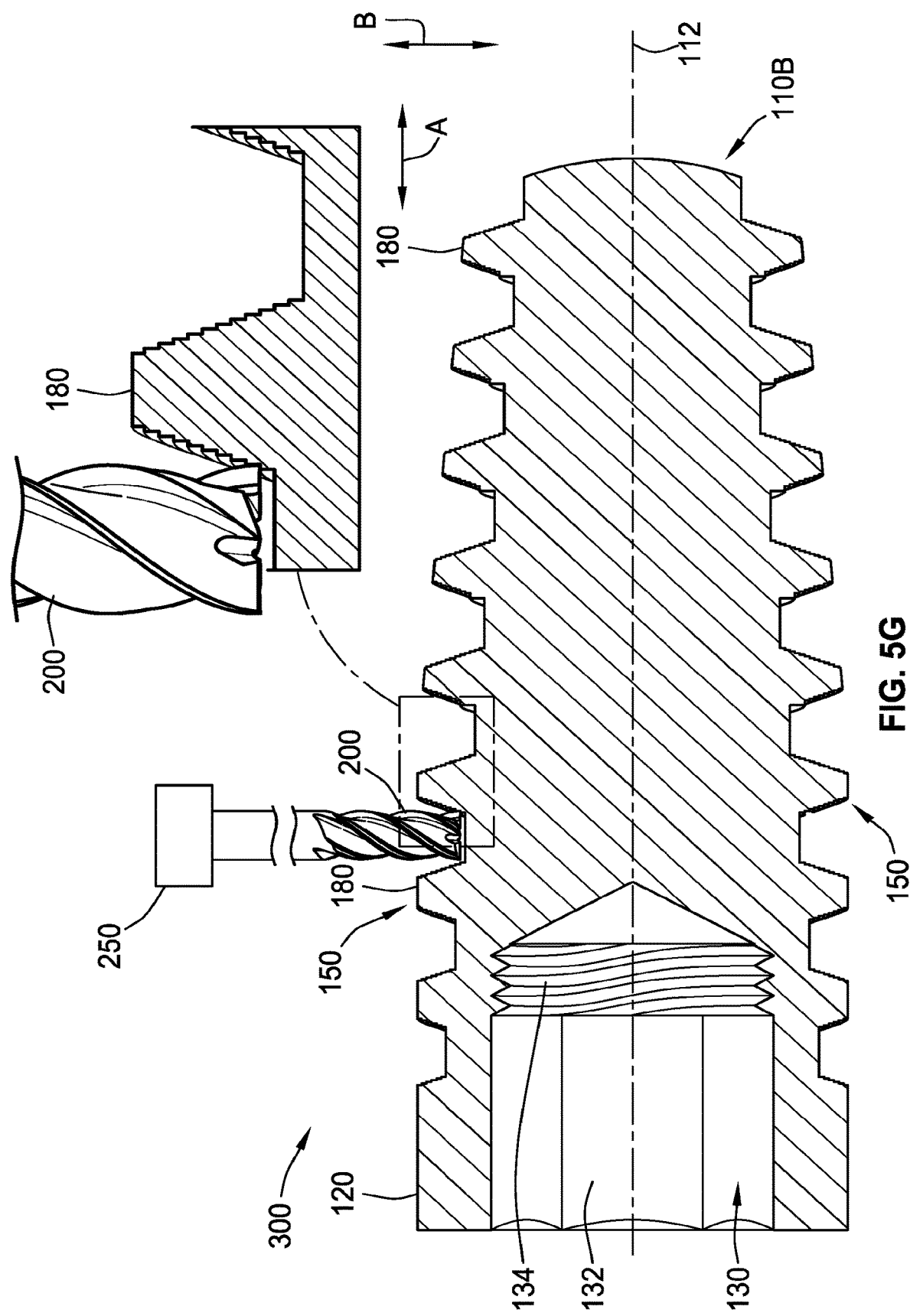
FIG. 5G is a cross-sectional side view illustrating another portion of the method of making the dental implant from the blank of FIG. 5A, according to some implementations of the present disclosure.

In some implementations, the cutting of the steps 165 in the coronal facing surface 160 begins with the computer guided cutting machine 250 positioning the cutter 200 at a thread cutting starting position 320 (FIG. 5F) adjacent to the collar 120 and/or the first turn of the thread 150. The depth of this cut is set by the computer guided cutting machine 250 to match or be the length or width or size, $Y_{R,C}$, (and/or $Y_{R,A}$) of the riser 167 (FIG. 4) of a first or outermost one of the plurality of steps 165 (FIG. 4) formed in the coronal facing surface 160. With the depth of cut set, the cutter 200 is moved in the directions of arrow A and/or arrow B to form the riser 167 and the tread 166 of the first or outermost one of the plurality of steps 165. As such, a portion of the thread 150 is also formed along the length of the implant blank 300. As shown in FIG. 5F, the process of cutting the steps 165 in the coronal facing surface 160 was completed three times and the fourth step 165 is shown as being partially completed as the cutter 200 still needs to move along the length of the implant blank 300 to the collar 120. Similarly, as shown in FIG. 5G, the process of moving the cutter 200 in the directions of arrow A and/or arrow B to form the riser 167 and the tread 166 of the fourth through eighth ones of the plurality of steps 165 has occurred with the ninth one of the plurality of steps 165 being partially formed.

Figure 6:
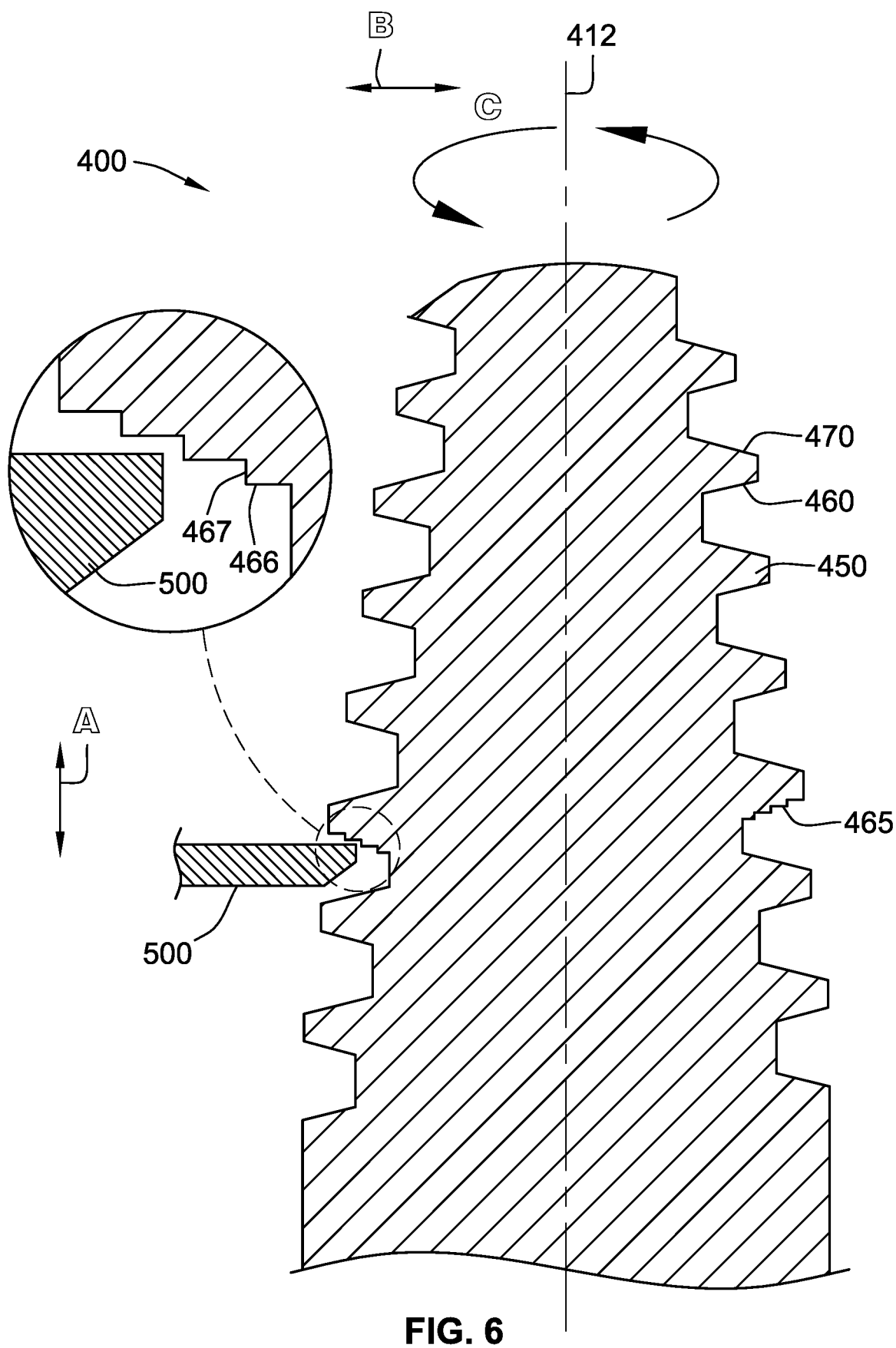
FIG. 6 is a cross-sectional side view of a dental implant being formed by a stationary cutting tool, according to some implementations of the present disclosure.

Referring generally to FIG. 6, an implementation is shown in which a dental implant 400, which is the same as, or similar to, dental implant 100, is formed by a cutter 500. The cutter 500 remains at least partially stationary during the forming of the dental implant 400. That is, while the discussion of FIGS. 5A-5G describes formation of the dental implant 100 from a blank that is stationary, in some implementations, the blank can move with respect to the cutter 500 during formation of the dental implant 400. As one example, the cutter 500 may remain stationary (with the exception of rotational motion of the cutter 500) and the blank is moved relative to the cutter 500 to form the dental implant 400. In such embodiments, the blank can rotate about the central axis 412 while the cutter 500 forms the threads 450 and/or steps 465 (e.g., including treads 466 and risers 467). Additionally, the blank can move linearly with respect to the cutter 500 (i.e., moved in the direction of arrow A and/or arrow B) while the cutter 500 forms the threads 450 and/or the steps 465. As another example, the cutter 500 can move linearly (i.e., move in the direction of arrow B) with respect to the dental implant 400 as the dental implant 400 rotates about the central axis 412. In such implementations, the dental implant 400 can move linearly (i.e., in the direction of arrow A) while rotating such that the threads 450 and/or steps 465 are formed. Though multiple examples of forming the dental implant 400 are provided while the blank moves relative to the cutter 500 during formation of the dental implant 400, such examples are not exhaustive. That is, the cutter 500 and/or the blank can move linearly (e.g., in the direction of arrow A and/or arrow B) and rotationally (e.g., in the direction of arrow C) during formation of the dental implant 400.

Although the example dental implant 400 depicted in FIG. 6 includes only the steps 465 in the coronal surface 460 of the grooves, it should be noted that corresponding steps (e.g., the steps 175 depicted in FIG. 4) can be formed in apical surface 470 of the threads 450 the dental implant 400.

Figure 7:
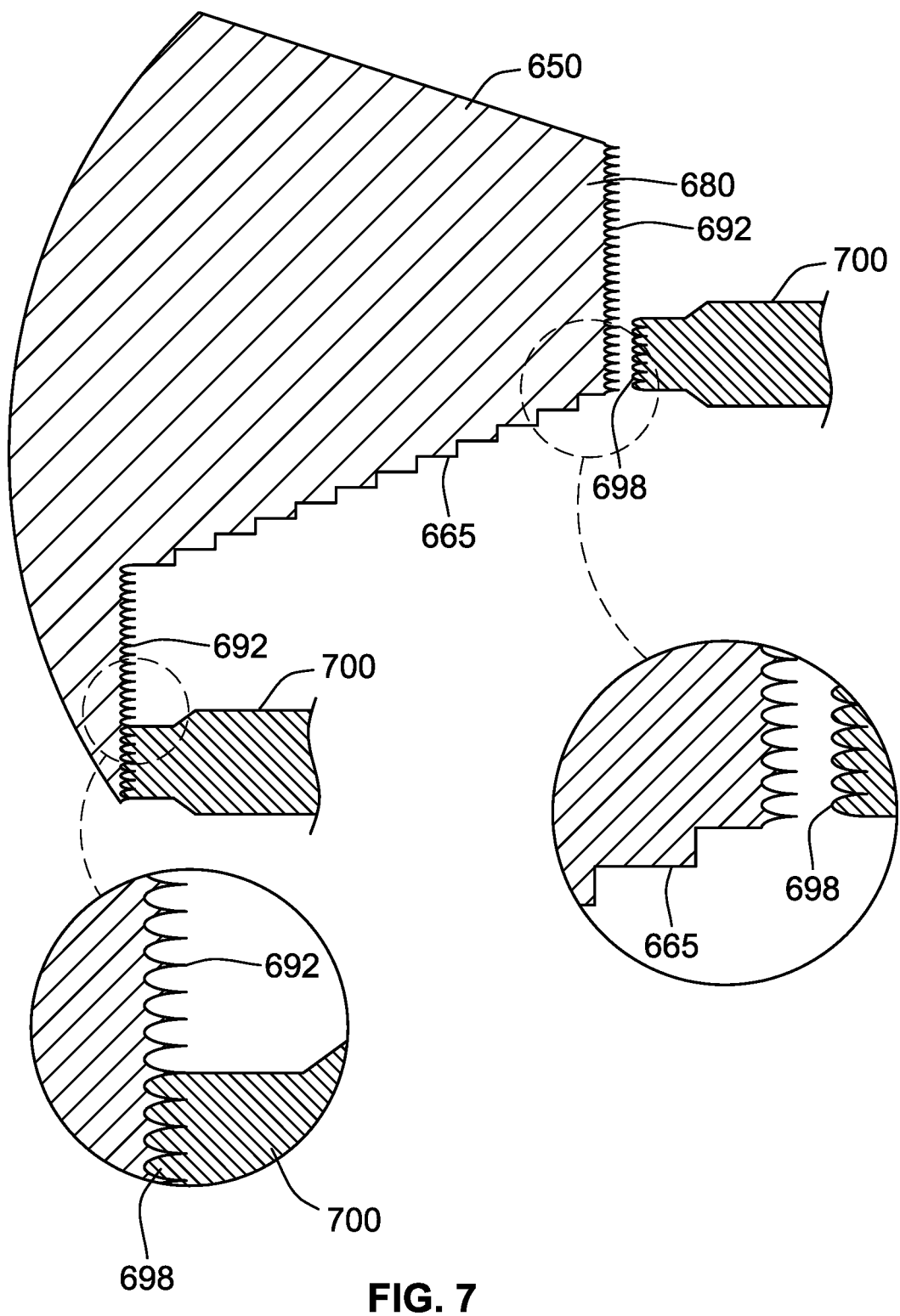
FIG. 7 is an enlarged view of the dental implant including grooves formed by a cutter including a grooved cutting surface, according to some implementations of the disclosure.

Referring generally to FIG. 7, a portion of a dental implant 600 is shown. Specifically, FIG. 7 depicts a portion of one thread 650 of the dental implant. The coronal surface 660 of the thread includes the steps 665. The thread 650 is formed by a cutting tool 700 including a grooved cutting surface 698. The grooved cutting surface 698 includes a plurality of grooves (i.e., a plurality of grooves of the cutting surface). The cutting tool 700 can be formed by a grinder (e.g., as described with respect to FIGS. 5A-5G) having a grit size between about 50 and 200. In such embodiments, the grit of the grinder forms the plurality of grooves in the grooved cutting surface 698.

Use of the cutting tool 700 with the grooved cutting surface 698 causes corresponding grooves 692 to be formed in the dental implant. The grooved cutting surface 698 can form the corresponding grooves 692 in at least a portion of a root surface 698 of the thread 650, at least a portion of the coronal facing surface 660 of the thread 650, at least a portion of the apical facing surface of the thread 650, at least a portion of the crest surface 680 of the thread 650, or any combination thereof. For example, as depicted in FIG. 7, the crest surface 680 and the root surface 698 include the corresponding grooves 692.

While it has been described herein that the steps 175 are first formed and then the steps 165 are formed, in some alternative implementations, the steps 165 in the coronal facing surface 160 can be formed first followed by the steps 175 in the apical facing surface 170. In some implementations, the steps 165, 175 can be formed in an alternating order such that a first one of the steps 175 is formed in the apical facing surface 170, then a first one of the steps 165 is formed in the coronal facing surface 160, followed by a second one of the steps 175 being formed in the apical facing surface 170, and so on. Various orders of forming the steps 165, 175 are possible and contemplated.

The dental implant 100 of the present disclosure with the steps 165, 175 is anisotropic and in some implementations has a relatively greater roughness in the axial direction (the direction of the central axis 112) than the radial direction (perpendicular to the central axis 112).

By having the steps 165, 175 (instead of surface treatments) to roughen the surface, the roughness characteristics of the dental implant 100 of the present disclosure are more repeatable and more consistent from dental implant to dental implant as compared with pitted surfaces (e.g., formed using acid treatments or blasting or the like). That is, pitted surfaces formed in dental implants from acid treatments and blasting can vary significantly from dental implant to dental implant.

The steps 165, 175 of the dental implant 100 provide a surface or surfaces that are less likely to have bacterial adhesion as compared with pitted surfaces on prior dental implants formed using acid treatments or blasting or the like. Put another way, bacteria are less likely to adhere to the dental implant 100 as compared to a dental implant with a pitted surface formed from acid treatments or blasting or the like. This results in a lower incidence of peri-implantitis when using the dental implant 100 of the present disclosure as compared with prior dental implants with pitted surfaces.

Additionally, the dental implant 100 of the present disclosure is relatively less corrosive as compared with prior dental implants with pitted surfaces. Corrosion can release metal ions in to the host, which can cause inflammation and/or peri-implantitis.

While the present disclosure has been described with reference to one or more particular embodiments and implementations, those skilled in the art will recognize that many changes may be made thereto without departing from the spirit and scope of the present disclosure. Each of these embodiments and implementations and obvious variations thereof is contemplated as falling within the spirit and scope of the present disclosure, which is set forth in the claims that follow.

What is claimed is:

1. A dental implant, comprising:
   a body having a central axis, a coronal end, and an apical end; and
   a thread coupled to the body, the thread having a coronal facing surface, an apical facing surface, and a crest surface positioned between the coronal facing surface and the apical facing surface, the coronal facing surface being generally at an angle relative to the central axis of the body, the coronal facing surface of the thread having a plurality of steps formed therein, wherein each of the plurality of steps has a tread and a riser, and wherein the tread and the riser define a generally L-shaped cross-section, a generally V-shaped cross-section, a generally U-shaped cross-section, a generally C-shaped cross-section, or any combination thereof, and wherein the tread generally extends in a first direction that is generally parallel to the central axis of the body and the riser extends in a second direction that is generally perpendicular to the central axis of the body.

2. The dental implant of claim 1, wherein the angle is between about 100 degrees and about 160 degrees.

3. The dental implant of claim 1, wherein a length of the tread and a length of the riser of each of the plurality of steps is based at least in part on (i) the angle of the coronal facing surface and (ii) a number of steps in the plurality of steps.

4. The dental implant of claim 1, wherein a length of the tread is between about 1 micrometer and about 20 micrometers and wherein a length of the riser is between about 5 micrometers and about 80 micrometers.

5. The dental implant of claim 1, wherein the thread includes a plurality of turns about the body and wherein the crest surface of at least a portion of at least one of the plurality of turns of the thread is generally parallel with the central axis of the body.

6. The dental implant of claim 5, further comprising a collar, the collar defining the coronal end of the body and wherein the thread generally extends from the collar to the apical end of the body.

7. The dental implant of claim 1, wherein the apical facing surface of the thread has a second plurality of steps formed therein, the apical facing surface being generally at a second angle relative to the central axis of the body.

8. A dental implant, comprising:
a body having a central axis, a coronal end, and an apical end; and
a thread coupled to the body, the thread having a coronal facing surface, an apical facing surface, and a crest surface positioned between the coronal facing surface and the apical facing surface, the apical facing surface being generally at an angle relative to the central axis of the body, the apical facing surface of the thread has a plurality of steps formed therein, wherein each of the plurality of steps has a tread and a riser, and wherein the tread and the riser define a generally L-shaped cross-section, a generally V-shaped cross-section, a generally U-shaped cross-section, a generally C-shaped cross-section, or any combination thereof, and wherein the tread generally extends in a first direction that is generally parallel to the central axis of the body and the riser extends in a second direction that is generally perpendicular to the central axis of the body.

9. The dental implant of claim 8, wherein the plurality of steps includes between about three steps and about thirty steps.

10. The dental implant of claim 8, wherein the angle is between about 100 degrees and about 160 degrees.

11. The dental implant of claim 8, wherein a length of the tread and a length of the riser of each of the plurality of steps is based at least in part on (i) the angle of the apical facing surface and (ii) a number of steps in the plurality of steps.

12. The dental implant of claim 8, wherein a length of the tread is between about 1 micrometer and about 20 micrometers and wherein a length of the riser is between about 5 micrometers and about 80 micrometers.

13. The dental implant of claim 8, wherein the thread includes a plurality of turns about the body and wherein the crest surface of at least a portion of at least one of the plurality of turns of the thread is generally parallel with the central axis of the body.

14. The dental implant of claim 13, further comprising a collar, the collar defining the coronal end of the body and wherein the thread generally extends from the collar to the apical end of the body.

15. The dental implant of claim 8, wherein the coronal facing surface of the thread has a second plurality of steps formed therein, the coronal facing surface being generally at a second angle relative to the central axis of the body.

* * * * *